Sept. 9, 1969 E. T. ULZURRUN 3,466,626
COMPUTER MEMORY HAVING ONE-ELEMENT-PER-BIT STORAGE
AND TWO-ELEMENTS-PER-BIT NOISE CANCELLATION
Filed Feb. 25, 1966 4 Sheets-Sheet 1

INVENTOR
EDUARDO T. ULZURRUN
BY Louis A Kline
John J. Maclago
Nathan Cass
HIS ATTORNEYS

INVENTOR
EDUARDO T. ULZURRUN

BY Louis A. Kline
John J. Maclago
Nathan Cass
HIS ATTORNEYS

Sept. 9, 1969 E. T. ULZURRUN 3,466,626

COMPUTER MEMORY HAVING ONE-ELEMENT-PER-BIT STORAGE AND TWO-ELEMENTS-PER-BIT NOISE CANCELLATION

Filed Feb. 25, 1966 4 Sheets-Sheet 3

INVENTOR
EDUARDO T. ULZURRUN

BY Louis A. Kline
John J. Matlago
Nathan Cass
HIS ATTORNEYS

INVENTOR
EDUARDO T. ULZURRUN

BY Louis A. Kline
John J. Matlago
Nathan Cass
HIS ATTORNEYS

United States Patent Office 3,466,626

Patented Sept. 9, 1969

3,466,626

COMPUTER MEMORY HAVING ONE-ELEMENT-PER-BIT STORAGE AND TWO-ELEMENTS-PER-BIT NOISE CANCELLATION

Eduardo T. Ulzurrun, Hollywood, Calif., assignor to The National Cash Register Company, Dayton, Ohio, a corporation of Maryland Filed Feb. 25, 1966, Ser. No. 530,042

Int. Cl. G11b *5/00*

U.S. Cl. 340—174 25 Claims

ABSTRACT OF THE DISCLOSURE

A memory arrangement for storing a plurality of multi-digit words in binary form with each digit being stored in in a bistable element. The arrangement includes a plurality of word lines each serially connecting energizing means of elements corresponding to digits of a plurality of words, and a plurality of sense lines each serially connecting the sensing means of elements corresponding to corresponding digits of different words. The sense lines are coupled together in pairs, the elements coupled to one sense line of a pair being coupled to the same word lines as are the elements of the other sense line of the pair but the two sense lines corresponding to different words. The sense lines of each pair are connected to an output detection means in opposing relation so as to cancel out undesired noise signals generated in the sense lines during readout of a digit stored in a selected element coupled to one of the sense lines.

This invention relates generally to memory devices for use in digital computers, and more particularly to an improved bistable memory arrangement and construction.

With the ever increasing use of digital computers, it has become of considerable importance to provide high speed, high capacity random access memories for use therein, and it is accordingly the broad object of the present invention to provide an improved construction and arrangement for a memory of this type.

It is well known that noise considerations are a major factor in the design of a bistable memory. Noise occurs in a bistable memory for a number of reasons, such as capacitive and inductive coupling between windings and lines, stray-field coupling, partial switching of elements, lack of uniformity of element characteristics, and variations in the pattern of information storage in the matrix.

One approach which has helped to significantly reduce noise problems in memories has been the employment of what is known in the art as a two element per bit organization in which an extra element is used for each bit and is arranged with respect thereto so as to balance out noise. While such a two element per bit organization is advantageous, the requirement of an extra element for each bit is a severe disadvantage, since the storage capacity is reduced by one-half. Accordingly, it is an object of the present invention to provide a memory which achieves the noise cancellation advantages of a two element per bit memory, while still using only one element per bit for information storage, and without requiring additional balancing lines.

Another object of this invention is to provide a memory organization which achieves a significant savings in the selection circuitry required.

Still another object of this invention in accordance with any or all of the foregoing objects is to provide a magnetic memory employing thin film rod elements.

A further object of this invention is to provide an improved construction and arrangement for a magnetic thin film rod memory array.

A still further object of this invention is to provide a thin film magnetic rod memory array having improved winding means.

Yet another object of this invention in accordance with any or all of the foregoing objects is to provide improvements in a memory in which each element has only two wires coupled thereto.

The specific nature of the invention as well as other objects, advantages and uses thereof will become apparent from the following description of an exemplary embodiment of the invention illustrated in the accompanying drawings in which.

Like numerals designate like elements throughout the figures of the drawings.

The features and advantages of the present invention will be illustrated as applied to a thin film rod memory of the same general type as illustrated in United States Patent Nos. 3,134,965; 3,184,720; and 3,228,012. However, it is to be understood that although the present invention is particularly advantageous for use with such thin film rod memories, the invention can also be used to advantage with other types of memories where it is desired to obtain the noise cancellation advantages of a two element per bit memory, while still using one element per bit for information storage.

Figures 1, 2:
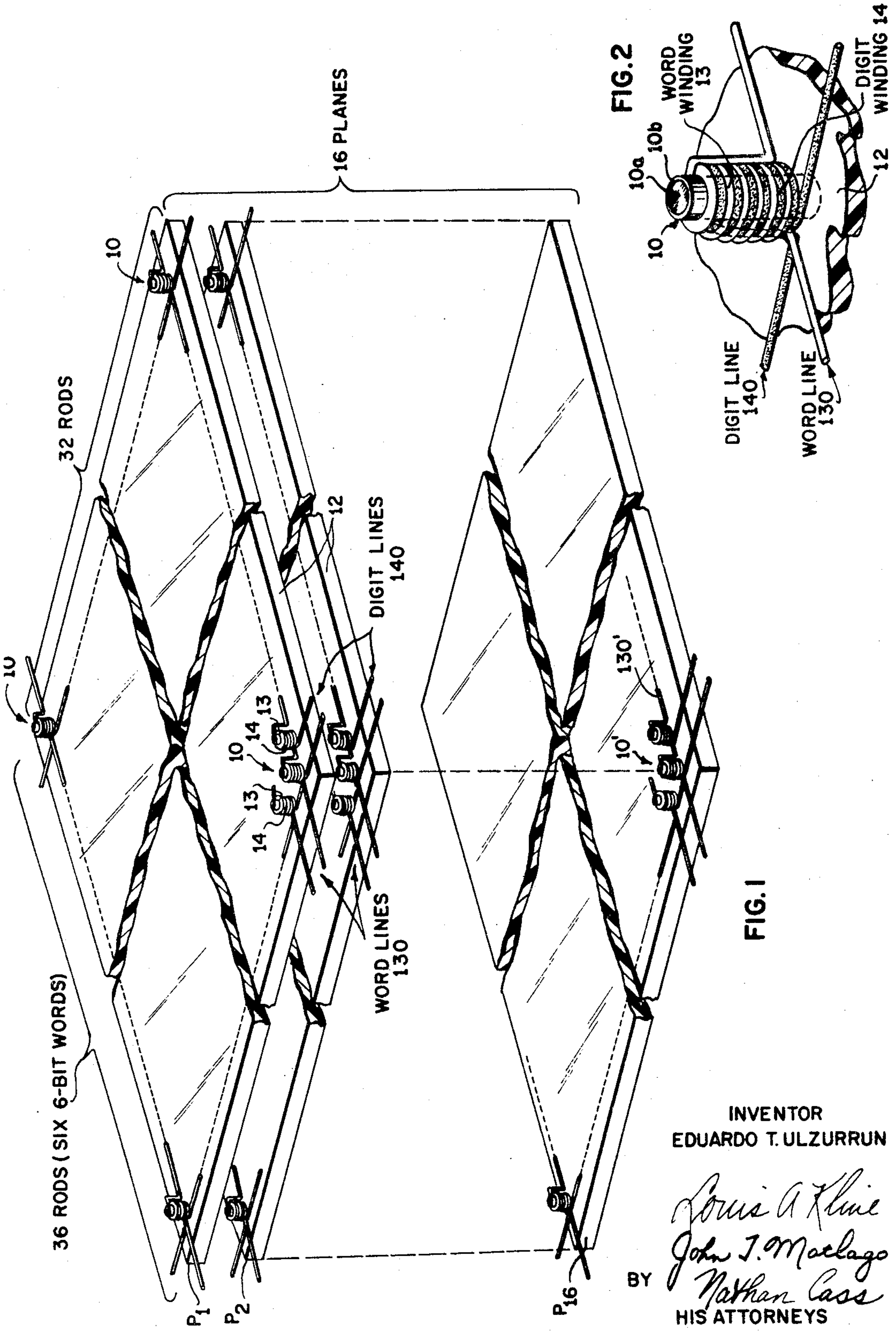
FIG. 1 is an overall view of a rod memory construction to which the present invention is applied.
FIG. 2 is an enlarged view of a typical rod element in the memory of FIG. 1 having respective interleaved word and digit windings coupled thereto.

FIG. 1 illustrates an exemplary rod memory construction to which the present invention will be applied for the purpose of illustration. The exemplary memory structure of FIG. 1 comprises, for example, a plurality of sixteen planes $P_1$–$P_{16}$, each plane being comprised of, for example, a 32 x 36 array of individual rod elements 10 disposed in respective ones of an array of windings suitably secured to a supporting base 12. Referring to FIG. 2 along with FIG. 1, it will be seen that each rod element 10 is provided with a word winding 13 and a digit winding 14 wound in interleaved fashion thereon so as to provide tight coupling of both windings to the rod. The word and digit windings in each plane are formed into a coordinate array by word lines 130 (FIG. 1) serially connecting respective word windings 13 in one coordinate direction, and by digit lines 140 serially connecting respective digit windings 14 in the other coordinate direction.

As shown in FIG. 2, each rod element 10 is preferably comprised of a rod-like inner conductive substrate 10*a* of beryllium copper having a diameter of about 10 mils, and on which is suitably deposited a thin magnetic film 10*b* having bistable magnetic switching properties. The thin magnetic film 10*b* may typically be an isotropic 1,000 to 5,000 angstrom electrodeposited coating of an alloy of approximately 97% iron and 3% nickel, or a bilayer of the type disclosed in United States Patent No. 3,213,431, or a permalloy film of approximately 80% nickel and 20% iron.

Alternatively, instead of using small individual rods as illustrated in FIGS. 1 and 2, the memory may be of the type illustrated in Patent No. 3,134,965 in which a plurality of planes are secured with their winding arrays aligned and a single long rod is passed through each group of respectively aligned windings.

At this point in the description, it will be helpful to consider the basic mode of operation of the exemplary embodiment of FIG. 1 being described herein. It is to be understood that each rod element 10 in FIGS. 1 and 2 may be switched between saturation in one or the other of its axial directions by suitably applied coincident half-select currents to its respective word and digit windings 13 and 14, neither of which currents acting alone is sufficient to cause switching. Saturation in one axial direction is designated as a binary "1" and in the other axial direction as a binary "0". Reading of data stored in a rod element 10 is accomplished by coincident half-select read currents flowing in its respective word and digit windings 13 and 14, via respective word and digit lines 130 and 140, which act to drive the rod element 10 to its "0" saturation state. Thus, if a "1" is stored in the selected rod element 10, the rod element switches from the "1" to the "0" saturation state, producing an output pulse indicative of a stored "1". This output pulse is detected via the respective digit winding 14 and digit line 140 with the advantages of two element per bit noise cancellation as will hereinafter be described. If, on the other hand, a "0" is stored in the selected rod element 10, no switching occurs and no output signal is obtained, thereby indicating a stored "0". To write a "1" into a rod element 10, coincident half-select write currents are applied to the respective word and digit windings 13 and 14 of the selected rod element 10, via the respective word and digit lines 130 and 140, so as to switch the rod element 10 to the "1" state from the "0" state in which it resides after reading. If, on the other hand, a "0" is to be written into the rod element 10, it is retained in the "0" state.

Figure 3:
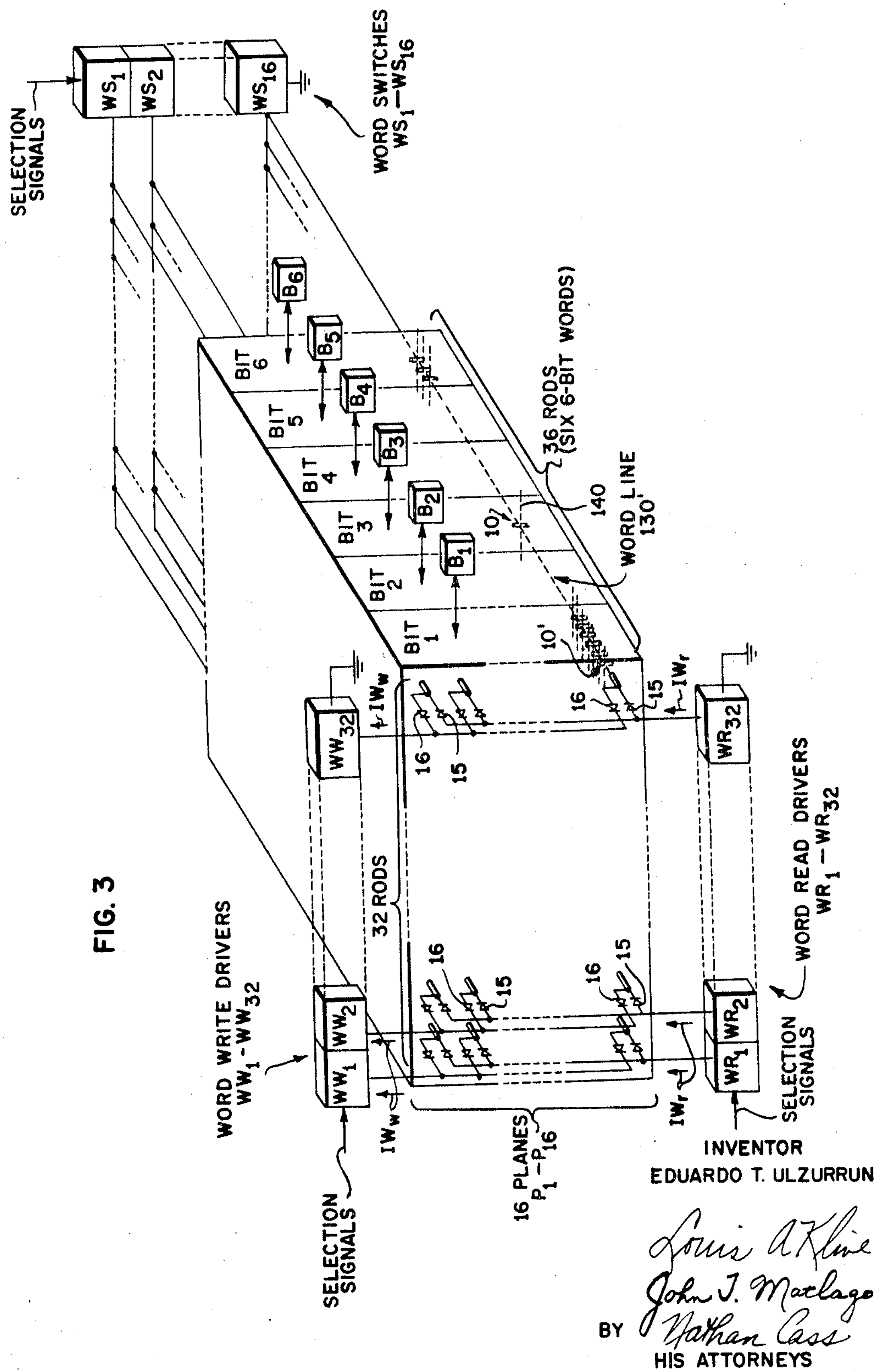
FIG. 3 is a schematic perspective diagram of the rod memory construction of FIG. 1 illustrating the linear selection means for selecting a desired word line to receive respective word read and write currents during respective read and write intervals.

Referring now to FIG. 3, illustrated therein is typical selection means which may be employed for applying word read and write currents $IW_r$ and $IW_w$ to a desired word line in the memory of FIG. 1 during respective reading and writing intervals. Each word line 130 serially connects the word windings of 36 rod elements corresponding to six 6-bit words. For greater clarity in describing the word selection arrangement, the digit line electrical connection arrangement is only generally indicated in FIG. 3 by the blocks $B_1$–$B_6$, and will be considered in detail later on in connection with FIGS. 4 and 5.

As illustrated in FIGS. 1 and 3, the particular exemplary embodiment being considered herein has $32\times16=512$ word lines, and selection of a particular word line is accomplished using a conventional linear selection arrangement with $32\times16$ factoring, as schematically illustrated in FIG. 3. More specifically, as shown in FIG. 3, the 512 word lines are connected at the front end of the array to form 32 columns, and at the back end of the array to form 16 rows. The 16 rows of word lines are in turn connected to respective ones of sixteen word switches $WS_1$–$WS_{16}$, while the 32 columns of word lines are in turn connected to 32 word read drivers $WR_1$–$WR_{32}$ and 32 word write drivers $WW_1$–$WW_{32}$ via respective isolating diodes 15 and 16. The word read and write drivers $WR_1$–$WR_{32}$ and $WW_1$–$WW_{32}$, and the word switches $WS_1$–$WS_{16}$ are controlled in a conventional manner by respective selection signals which select a desired word line to receive word read or write current $IW_r$ or $IW_w$ during respective read and write intervals. For example, selection of word read driver $WR_{32}$ and word switch $WS_{16}$ during a reading interval will result in a word read current $IW_r$ flowing in word line 130' shown in the lower right corner in FIGS. 1 and 3.

Figure 4:
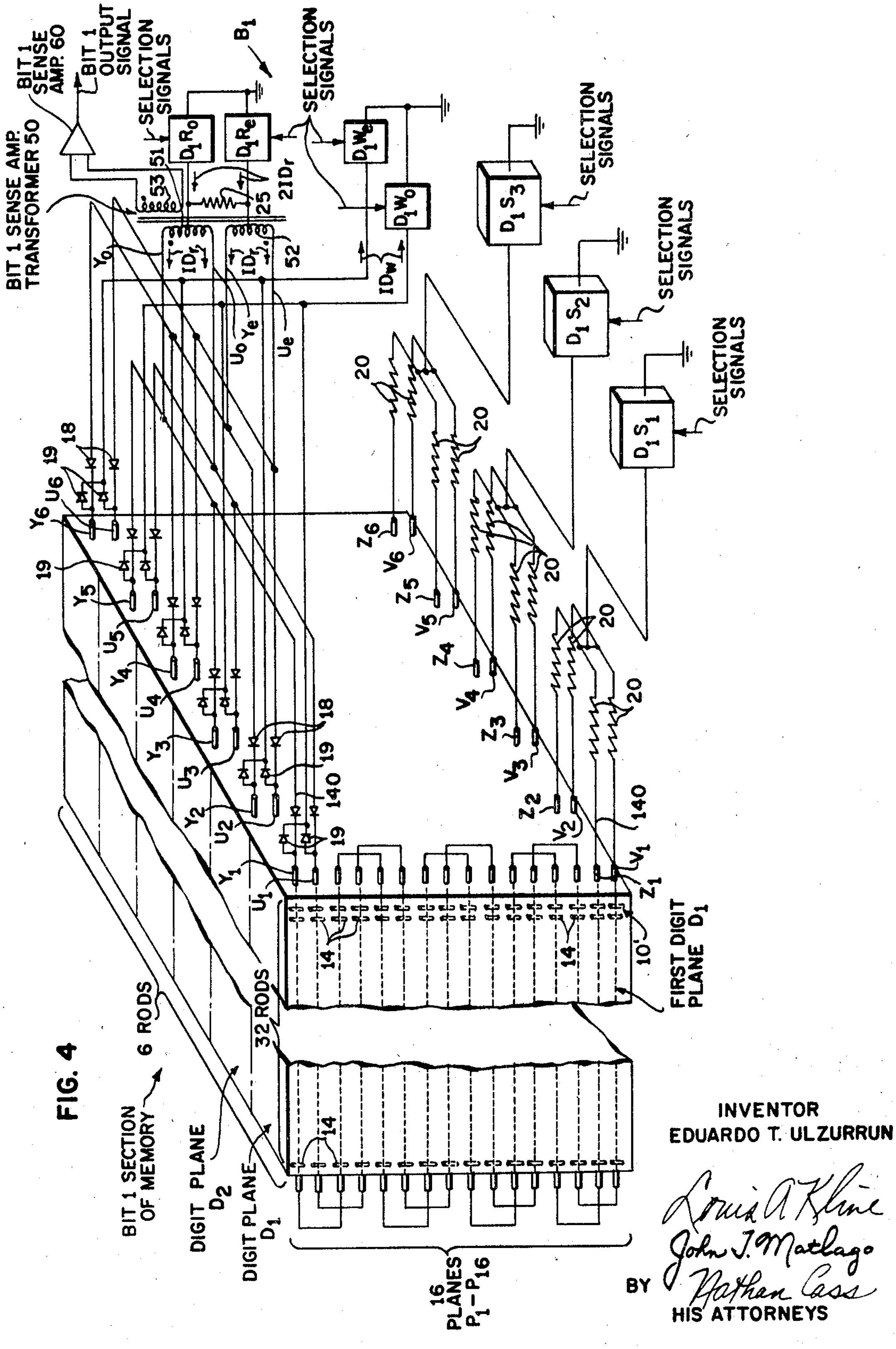
FIG. 4 is a schematic diagram illustrating the $B_1$ digit line connection arrangement for the portion of the memory of FIG. 1 corresponding to the first bit (Bit 1) of each of the 3072 words in the array.
Figure 5:
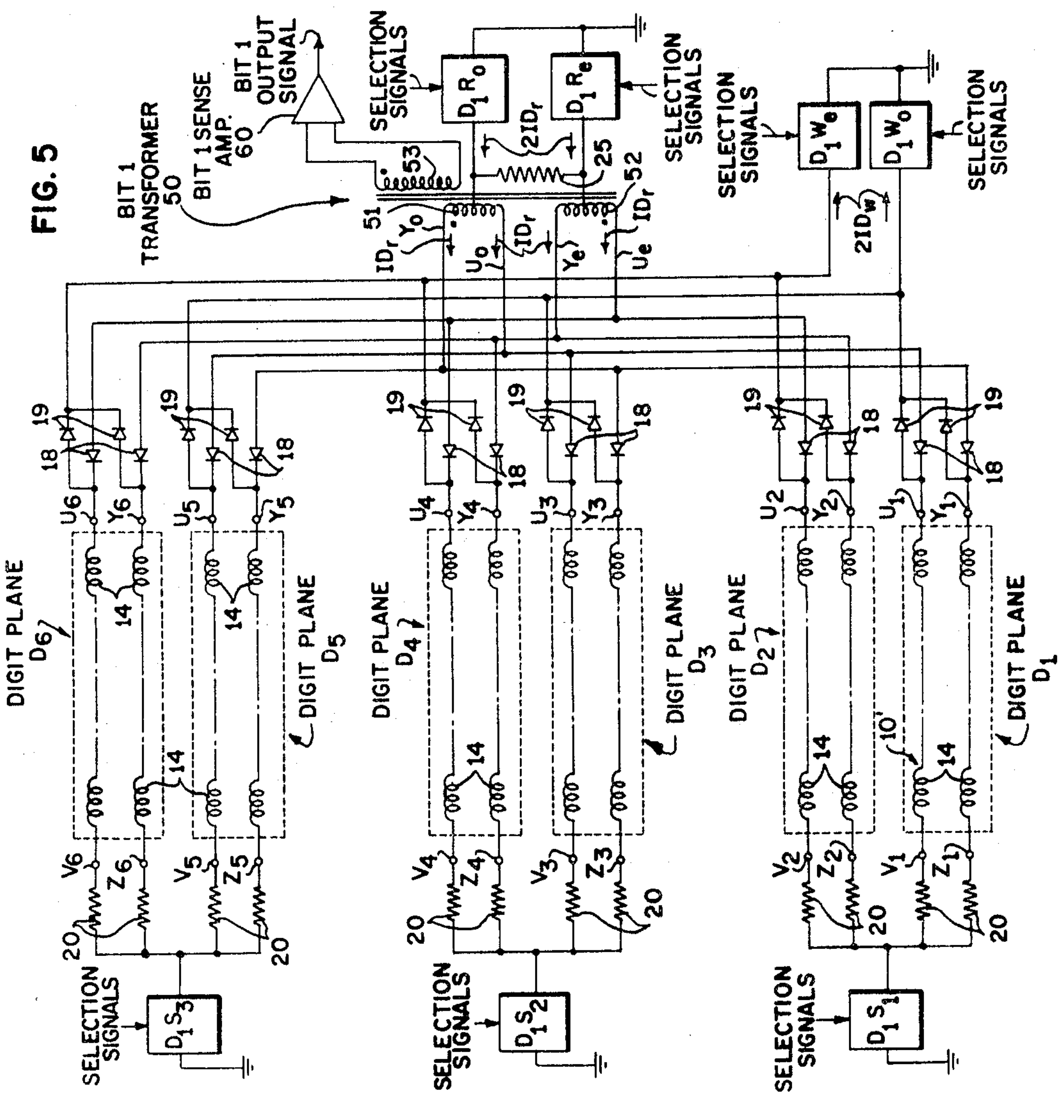
FIG. 5 is an electrical diagram illustrating the $B_1$ digit line connection arrangement of FIG. 4 in more conventional form.

As mentioned previously, the exemplary memory of FIGS. 1 and 3 may typically be organized so that each word line comprises six 6-bit words, only one of which is read out or written into during a respective reading or writing interval. The memory is further arranged so that all of the like positioned bits of each word are grouped together to form respective Bit 1, Bit 2, . . . Bit 6 sections of the memory which cooperate with respective digit line connection arrangements $B_1$ to $B_6$ as shown in FIG. 3. Each of the digit line connection arrangements $B_1$ to $B_6$ may be constructed in the same manner, so that the construction and operation of all of them may be understood by considering the $B_1$ digit line connection arrangement illustrated in detail in FIGS. 4 and 5. Since the electrical wiring arrangement of FIG. 4 is shown superimposed on the physical arrangement, it may be somewhat difficult to follow and, accordingly, the more conventional wiring diagram of FIG. 5 showing the same Bit 1 electrical connections as FIG. 4 has also been provided. The word windings and lines have been omitted in FIGS. 4 and 5, and the spacing between digit planes in FIG. 4 has been exaggerated for the sake of clarity.

Thus, referring to FIGS. 4 and 5, it will be understood that the Bit 1 section of the memory shown in FIG. 3 comprises six digit planes $D_1$–$D_6$ respectively corresponding to the first bit of each of the six words on each word line. The digit windings 14 in each digit plane are connected as shown in the first digit plane $D_1$ in FIG. 4 so as to form two series strings for each digit plane which are designated YZ and UV, with subscripts identifying the particular one of the six digit planes to which each string corresponds. Each YZ series string is formed by serially connecting upper alternating rows of digit windings 14 in its respective digit plane, while each UV series string is formed by serially connecting lower alternating rows of digit windings 14 in its respective plane.

The manner in which the respective YZ and UV series strings in FIGS. 4 and 5 are connected for reading purposes will be considered first. Since, in the exemplary embodiment being considered herein, only one word is read out from the memory during a reading interval, only one bit 1 rod element will receive coincident word and digit read currents in its respective word and digit windings during a reading interval. Consequently, during reading only one output signal can be produced in the bit 1 memory section illustrated in FIGS. 4 and 5, the occurrence of an output signal indicating the storage of a binary "1" in the bit 1 element corresponding to the selected word, while the absence of an output pulse indicates a stored "0" therein. As will be considered in more detail hereinafter, the same digit lines 140 used for supplying the read digit current $ID_r$ to the selected digit plane from a selected read current driver $D_1R_0$ or $D_1R_e$ are also used for feeding the output signal induced in the respective digit winding 14 of the selected rod element to a bit 1 sense amplifier transformer 50 whose output winding 53 is in turn fed to a bit 1 sense amplifier 60 which produces the resultant bit 1 output signal. The sense amplifier 60 may be of the form as disclosed in Patent No. 3,211,921, issued Oct. 12, 1965.

As illustrated in FIGS. 4 and 5, the sense amplifier transformer 50 has an output winding 53 feeding the bit 1 sense amplifier 60, two primary windings 51 and 52 which have their center taps coupled to respective read digit drivers $D_1R_0$ and $D_1R_e$ and a parallel resistor 25, and their ends $Y_0$, $U_0$, $Y_e$ and $U_e$ coupled to respective ones of the series-string Y and U terminals. As is conventional, the "dot" at one end of each transformer winding indicates the relative polarities thereof. The resistor 25 connected between the center taps of primary windings 51 and 52 plays an important part in achieving the effect of two core per bit noise cancellation, as will be explained hereinafter.

More specifically, it will be seen in FIGS. 4 and 5 that the Y terminals of odd digit planes (that is $Y_1$, $Y_3$ and $Y_5$) are each connected via a respective isolating diode 18 to the $Y_0$ side of primary winding 51, while the Y terminals of even digit planes (that is, $Y_2$, $Y_4$ and $Y_6$) are connected via a respective isolating diode 18 to the $Y_e$ side of the other primary winding 52; also, the U terminals in odd digit planes (that is, $U_1$, $U_3$ and $U_5$) are each connected via a respective isolating diode 18 to the $U_0$ side of primary winding 51, while the U terminals in even digit planes (that is, $U_2$, $U_4$ and $U_6$) are each connected via a respective isolating diode 18 to the $U_e$ side of primary winding 52.

As for the Z and V terminals of the YZ and UV series strings, it will be seen from FIGS. 4 and 5 that terminals $Z_1$, $Z_2$, $V_1$ and $V_2$ are each connected via a respective impedance matching resistor 20 to a first digit switch $D_1S_1$, terminals $Z_3$, $Z_4$, $V_3$ and $V_4$ are each connected via a respective impedance matching resistor 20 to a second digit switch $D_1S_2$, and terminals $Z_5$, $Z_6$, $V_5$ and $V_6$ are each connected via a respective impedance matching resistor 20 to a third digit switch $D_1S_3$.

Considering now the digit connection arrangement illustrated in FIGS. 4 and 5 for supplying the digit write current $ID_w$ during a writing interval, it will be understood that the same three digit switches $D_1S_1$ to $D_1S_3$ are employed with respect to series-string terminals V and Z. The other series-string terminals Y and U are connected to respective digit write drivers $D_1W_0$ and $D_1W_e$ through a respective isolating diode 19. More specifically, the U and Y terminals in odd digit planes (that is, $U_1$, $U_3$ and $U_5$ and $Y_1$, $Y_3$ and $Y_5$) are each connected via a respective isolating diode 19 to digit write driver $D_1W_0$, while the U and Y terminals in even digit planes (that is, $U_2$, $U_4$ and $U_6$ and $Y_2$, $Y_4$ and $Y_6$) are each connected via a respective isolating diode 19 to digit write driver $D_1W_e$.

Having described the word and digit selection arrangements for the exemplary matrix of FIG. 1, the advantages thereof will now be made evident by describing with additional reference to FIG. 6, a typical read-write cycle involving selection of, for example, the first word of the six words on the lower right word line 130' in FIGS. 1 and 3.

Figure 6:
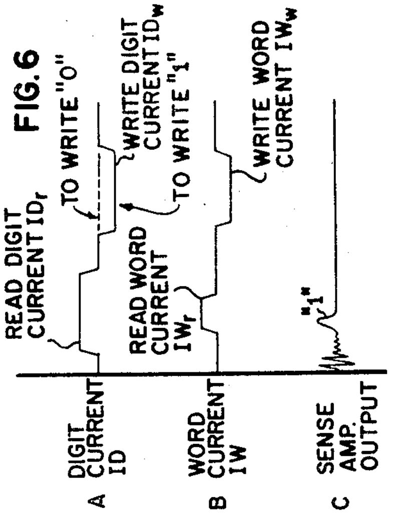
FIG. 6 is a plurality of graphs illustrating typical waveforms during a read-write cycle.

A read-write cycle may be considered to be initiated, as illustrated in graph A of FIG. 6, by the application of half-select read digit current $ID_r$ to the respective digit planes in the bit 1 to 6 sections (FIG. 3) containing the six bits corresponding to the selected one of the six words on the selected word line which is to be accessed during the read-write cycle. Since it is assumed that it is the first word on the selected word line which is to be accessed in this example, the particular digit read drivers and digit switches which will be activated (by their respective selection signals) will be those which will cause half-select digit read current $ID_r$ to flow in the digit windings of the first digit plane $D_1$ of each bit section.

Consequently, for the $B_1$ digit connection arrangement illustrated in FIGS. 4 and 5, it will be the odd digit read driver $D_1R_0$ and the first digit switch $D_1S_1$ which will be activated in order to cause half-select digit read current $ID_r$ to flow in the digit windings 14 of digit plane $D_1$. As will be understood from FIGS. 4 and 5, the activation of digit read driver $D_1R_0$ will cause a current $2ID_r$ to flow to the center tap of primary winding 51, at which point it divides equally so as to cause a half-select digit read current $ID_r$ to flow via a respective isolating diode 18 through each of the $Y_1Z_1$ and $U_1V_1$ series strings of digit windings 14 in digit plane $D_1$ of bit 1, after which the digit read currents $ID_r$ flow via their respective impedance matching resistor 20 to circuit ground through the selected digit switch $D_1S_1$. In effect, therefore, the selection of digit read driver $D_1R_0$ and digit switch $D_1S_1$ places series strings $Y_1Z_1$ and $U_1V_1$ in parallel with respect to current flowing from digit read driver $D_1R_0$ via the primary winding 51 of transformer 50.

As explained previously in connection with FIG. 3, half-select word read current $IW_r$ is caused to flow in word line 130' containing the selected word by activation of word read driver $WR_{32}$ and word switch $WS_{16}$. The selected bit 1 rod element which will receive coincident word and digit read currents is indicated at 10' in FIGS. 1, 3 and 4, and it will be understood that a like positioned rod element corresponding to a respective bit of the selected word is similarly selected in the bit 2–6 sections (FIG. 3) of the memory.

As illustrated in graphs B and C of FIG. 6, application of the word read curent $IW_r$ is delayed until the noise caused by application of the digit read current $ID_r$ in graph A substantially dies out, thereby permitting the respective digit winding 14 and the respective digit lines to be used for detecting any induced signal caused by switching of the selected rod element 10', the occurrence of an output signal indicating that a "1" is stored in the selected element 10', and the absence of an output signal indicating the storage of a "0" therein.

As illustrated in graph A of FIG. 6, the above described reading operation is followed by a writing operation, which will be assumed to occur with respect to the same word as accessed during reading, but this is not an essential requirement. If a "0" is to be written into a particular bit of the selected word, then its respective digit connection arrangement ($B_1$ to $B_6$ in FIG. 3) is maintained inactive during writing, so that the respective rod element corresponding to the selected word is retained in the "0" state in which it was left after reading, since the half-select word write current is not sufficient by itself to cause switching. However, if a "1" is to be written into a bit of the selected word, its respective digit connection arangement ($B_1$ to $B_6$) is activated to cause half-select digit write current $ID_w$ (graph A in FIG. 6) to flow in the same digit plane $D_1$ as selected during the previously described reading operation.

Consequently, for the $B_1$ digit connection arrangement illustrated in FIGS. 4 and 5, if a "1" is to be written into the rod element 10' of the selected word, it will be the odd digit write driver $D_1W_0$ and the first digit switch $D_1S_1$ which will be activated in order to cause half-select digit write current $ID_w$ to flow in the digit windings of digit plane $D_1$. More specifically, it will be understood from FIGS. 4 and 5, that the odd digit write driver $D_1W_0$, when activated, provides a current of $2ID_w$ which flows to series strings $U_1V_1$ and $Y_1Z_1$ of digit plane $D_1$ via a respective isolating diode 19, and divides equally between these two strings so as to provide a half-select digit write current $ID_w$ for each string which is in the opposite direction from the previously applied digit read current $ID_r$. After flowing through each of the series strings $U_1V_1$ and $Y_1Z_1$, the digit write current $ID_w$ completes its circuit through its respective impedance matching resistor 20 and the first digit switch $D_1S_1$. Of course, if a "0" is to be written into the selected bit 1 rod element 10', both digit write drivers will remain inactivated so that none of the bit 1 digit planes will receive digit write current.

As illustrated in graphs A and B of FIG. 6, a short time after application of the digit write current $ID_w$, half-select word write current $IW_w$ is applied to the selected word line 130' in FIG. 3 by activating word write driver $WW_{32}$ and word digit switch $WS_{16}$. Thus, if a "1" is to be written into the selected rod element 10' in FIGS. 3 and 4, it will receive coincident word write and digit write currents, causing it to switch to the "1" state. If, one the other hand, a "0" is to be written therein, the rod element 10' will receive only half-select word write current, and thereby remain in the "0" state. It will be understood that, in a like manner, either a "1" or "0" can be stored in the rod elements corresponding to the selected word in the bit 2 to 6 sections of the memory.

Now that a typical read-write cycle has been described, the advantageous noise cancellation features of the present invention will be considered in more detail. It will be appreciated that one source of noise is the digit noise resulting from digit current flow in the digit windings 14 of the selected digit plane in each bit section. This digit noise is substantially cancelled in accordance with the present invention (as illustrated for the bit 1 digit plane $D_1$ in FIG. 4) by dividing the digit windings 14 in each digit plane into two series strings UV and YZ having approximately the same digit noise generation, and then connecting these series strings to their respective transformer primary windings 51 and 52 (FIGS. 4 and 5) in cancelling fashion with respect to the output winding 53, so that substantially no digit noise reaches the sense amplifier 60. This method of digit noise cancellation is well known in the art as common mode rejection.

However, besides digit noise, other noise occurs which can not be cancelled out by the use of common mode rejection. Of particular significance is the noise arising because of the capacitive and inductive coupling between word and digit windings and lines, which unfortunately appears just at the critical moment—that is, during reading. In a rod memory array having interleaved word and digit windings 13 and 14, as illustrated in FIG. 2, the problem is particularly severe because of the relatively large capacity and inductance between the word and digit windings 13 and 14. Also, since each memory plane is a mesh, the capacitive coupling between word and digit lines may be even larger than the individual coupling between the two interleaved windings 13 and 14.

In accordance with the present invention, both capacitive and inductive noise are advantageously cancelled using two element per bit cancellation techniques, while still permitting one element per bit to be used for data storage. This is accomplished in accordance with the present invention, by coupling in cancelling fashion to the sense amplifier transformer 50 (FIGS. 4 and 5), an inactive digit plane having substantially the same inductive and capacitive noise generated therein as the selected digit plane.

The bit 1 digit connection arrangement shown in FIGS. 4 and 5 illustrates how this approach may be implemented for inductive and capacitive noise cancellation. The six digit planes $D_1$ to $D_6$ are divided into pairs of $D_1$ and $D_2$, $D_3$ and $D_4$, and $D_5$ and $D_6$, and are caused to operate so that if a digit plane of a pair is selected, the other unselected digit plane of the pair will automatically apply its inductive and capacitive noise signals to the sense amplifier transformer 50 so as to oppose like inductive and capacitive signals produced in the selected digit plane of the pair, thereby achieving the desired cancellation of inductive and capacitive noise.

In order to permit the inductive and capacitive noise in the unselected digit plane of a pair to be able to pass to the sense amplifier transformer 50 when the other digit plane of the pair is selected, the resistor 25 (FIGS. 4 and 5) is provided connected between the center taps of primary windings 51 and 52 and across digit read drivers $D_1R_0$ and $D_1R_e$. This resistor 25 is chosen to have a value so that sufficient current flows to the unselected digit plane of the pair to forward bias its respective isolating diodes 18, thereby permitting the capacitive and inductive noise signals occurring therein to pass therethrough to the sense amplifier transformer 50 for cancellation with like signals of the selected digit plane. For example, if digit plane $D_1$ is selected in FIGS. 4 and 5 as a result of the activation of odd digit read driver $D_1R_0$ and first digit switch $D_1S_1$, a read digit current $ID_r$ will flow via primary winding 51 to each series string $U_1V_1$ and $Y_1Z_1$ of digit plane $D_1$, as described previously. However, in addition, because of the presence of resistor 25, a small biasing current $I_b$ will also flow from the selected odd digit read driver $D_1R_0$, via resistor 25, to the series strings $U_2V_2$ and $Y_2Z_2$ of the unselected digit plane $D_2$ of the $D_1$, $D_2$ pair. This biasing current $I_b$ is sufficient to forward bias the respective isolating diodes 18 of the $D_2$ series strings $U_2V_2$ and $Y_2Z_2$, but is so very much less than the half-select digit read current $ID_r$ as to be negligible in affecting the state of the rod elements in digit plane $D_2$.

When the word read current $IW_r$ is applied to the selected word line 130' (FIG. 3), it will produce substantially the same inductive and capacitive noise in digit planes $D_1$ and $D_2$. Since, as shown in FIGS. 4 and 5, the YZ and UV series strings in odd digit planes are connected to the sense amplifier transformer 50 in opposing fashion with respect to the YZ and UV series strings in even digit planes, the inductive and capacitive noise created in the unselected digit plane, in this case $D_2$, will pass to the sense amplifier transformer 50 through its respective isolating diodes 18 (which have been forward biased as a result of bias current flow to the unselected digit plane via resistor 25), so as to thereby cancel out like inductive and capacitive noise created in the selected digit plane, in this case $D_1$.

It will thus now be evident that the memory arrangement described herein in accordance with the invention not only provides common mode rejection which cancels digit noise, but also, inductive and capacitive noise is also cancelled, and all this is achieved while still permitting one element per bit to be used for data storage. Typically, a memory as just described may operate with a read-write cycle time of less than 1 microsecond.

It will be recognized that the particular embodiment of the invention described herein is only exemplary, and that the invention is applicable to other types of memories and memory organizations. Accordingly, the present invention is to be considered as including all possible embodiments coming within the scope of the invention as defined in the appended claims.

What is claimed is:

1. In a memory capable of storing a plurality of multi-digit words in binary form and of having a word read out therefrom, a large plurality of bistable elements, each element corresponding to a binary digit of a word in said memory and being switchable from one state to the other in response to an applied energization of at least a predetermined magnitude, at least one energization means coupled to each element, a sensing means coupled to each element for sensing a change in state thereof, means coupling said energization means so as to form a plurality of word lines each containing the energization means of elements corresponding to a plurality of multi-digit words, means coupling said sensing means so as to form a plurality of pairs of series strings, each string coupling sensing means of elements corresponding to the same respective digit of different words on different word lines and each string of a pair coupling sensing means of elements corresponding to the same respective digit and word line, output detection means, and means coupling each pair of strings to said output detection means in opposing relation.

2. In a memory capable of storing a plurality of multi-digit words in binary form and of having a word read out therefrom, a large plurality of bistable storage elements, each element corresponding to a binary digit of a word in said memory and being switchable from one state to the other in response to an applied energization of at least a predetermined magnitude, at least one energization means coupled to each element, a sensing means coupled to each element for sensing a change of state thereof, means coupling said energization means so as to form a plurality of word lines each containing energization means of elements corresponding to a plurality of multi-digit words, means coupling said sensing means so as to form a plurality of series strings arranged in first and second pairs such that each string is common to a respective first pair and a respective second pair, each string coupling sensing means of elements corresponding to the same respective digit of different words on different word lines, each string of each first pair coupling sensing means of elements corresponding to the same respective digit and word line and each string of each second pair coupling sensing means of elements corresponding to the same respective digit but on different word lines, output detection means, and coupling means coupling each of said first and second pairs of strings to said output detection means in opposing relation.

3. In a memory capable of storing a plurality of multi-digit words in binary form and of having a word stored therein and read out therefrom, a large plurality of bistable elements, each element corresponding to a binary digit of a word in said memory and being switchable from one state to the other in response to an applied energization of at least a predetermined magnitude, operating means coupled to each element, means coupled to said operating means so as to form a plurality of word lines each coupling elements corresponding to a plurality of multi-digit words and each digit of a word being on the same word line, energization means for applying energization of at least said predetermined magnitude to the elements of a selected word, said energization means including means for applying energization to a selected word line, means coupled to said operating means so as to form a plurality of pairs of series strings, each string coupling elements corresponding to the same respective digit of different words on different word lines and each string in a pair coupling elements corresponding to the same respective digit and word line, an output detection means for each digit, and coupling means for coupling each pair of strings to its respective output detection means in opposing relation.

4. The invention in accordance with claim 2, wherein said bistable elements are each magnetic, wherein said energization means and said sensing means comprise a plurality of wires inductively coupled to each element, and wherein each output detection means includes an output transformer.

5. The invention in accordance with claim 3, wherein said strings also form a plurality of second pairs of strings such that each string is common to a respective one of said first-mentioned pairs and a respective one of said second pairs, each string of each second pair corresponding to the same respective digit but on different word lines, and wherein said coupling means is constructed and arranged to couple each string of each second pair to its respective output detection means in opposing relation.

6. The invention in accordance with claim 3, wherein said coupling means is constructed and arranged in cooperation with said energization means so that when a selected element in one series string of a pair receives energization of at least said predetermined magnitude both strings of the pair will be operatively coupled to provide opposing noise signals to its respective output detection means.

7. The invention in accordance with claim 3, wherein said coupling means includes isolating means for normally preventing signals in said series strings from being coupled to their respective output detection means, and wherein said coupling means cooperates with said energization means so that when a selected element in one series string of a pair receives energization of at least said predetermined magnitude said isolating means will be conditioned to permit signals in both strings of the pair to pass to their respective output detection means.

8. The invention in accordance with claim 5, wherein said coupling means includes isolating means for normally preventing output signals in said series strings from being coupled to their respective output detection means, and wherein said coupling means cooperates with said energization means so that when a selected element in a series string receives energization of at least said predetermined magnitude said isolating means will be conditioned to permit signals in the selected string as well as signals in the corresponding first and second pair strings to pass to their respective output detection means.

9. The invention in accordance with claim 4, wherein said strings are formed into two groups of digit planes for each digit with each digit plane in each group containing the strings of a second pair, each digit plane of a group having a corresponding digit plane in the other group which contains the respective first pair strings thereof, wherein said output transformer comprises first and second primary windings and an output winding, wherein the strings in each digit plane of one group are coupled to their respective first primary winding in opposing relation, wherein the strings in each digit plane of the other group are coupled to their respective second primary winding in opposing relation, and wherein the first and second primary windings of each transformer are poled with respect to its respective output winding so that the strings of each digit plane of one group are in opposing relation with respect to each digit plane of the other group.

10. The invention in accordance with claim 9, wherein said coupling means is constructed and arranged so that when a selected element in one series string of a digit plane of a group is selected to receive said energization of at least said predetermined magnitude both series strings in the selected digit plane as well as the respective first pair series strings in the corresponding digit plane of the other group will apply signals induced therein to their respective transformer primary windings.

11. The invention in accordance with claim 9, wherein said coupling means includes isolating means for normally preventing signals induced in said series strings from passing to said transformer, wherein energization means is provided for applying said predetermined energization to the elements of a selected word, said energization means including word energization means for applying energization to a selected word line and digit energization means for applying energization to the strings of a selected digit plane, said coupling means being constructed and arranged for cooperation with said digit energization means so that when a digit plane of a group is selected to receive energization from said digit energization means said isolating means will be conditioned to permit both series strings in the selected digit plane as well as the respective first pair series strings in the corresponding digit plane of the other group to apply signals induced therein to their respective transformer primary windings.

12. The invention in accordance with claim 11, wherein said isolating means includes a diode in each series string.

13. The invention in accordance with claim 11, wherein energization from said digit energization means is applied to the series strings of a selected digit plane via its respective transformer primary winding, said digit energization means being applied to said transformer primary winding so as to produce opposing signals which are substantially cancelled in said output winding.

14. The invention in accordance with claim 11, wherein said isolating means includes a diode in each series string, wherein each of said primary windings has a center tap, wherein energization from said digit energization means is applied to a selected digit plane via the center tap of its respective transformer primary winding, wherein an impedance means is coupled between the center taps of the first and second primary windings of each transformer, and wherein said impedance means is chosen so that when energization is applied from said digit energization means to a selected digit plane in one group via the center tap of its respective primary winding sufficient energization flows via said impedance means and the center tap of the other primary winding to the corresponding digit plane in the other group to forward bias its respective isolating diodes but insufficient to affect the state of the elements therein.

15. The invention in accordance with claim 14, wherein the energizations applied to a word line and to each series string in a selected digit plane are each insufficient by themselves to affect the state of an element coupled thereby but when occurring coincidentally with respect to an element provide energization of at least said predetermined magnitude.

16. The invention in accordance with claim 4, where each bistable element is a magnetic rod comprising an inner non-magnetic rod-like substrate having a bistable thin film of magnetic material provided thereon with a thickness of less than 10,000 angstroms.

17. The invention in accordance with claim 16, wherein said plurality of wires are wound in an interleaved manner on each rod.

18. The invention in accordance with claim 16, wherein predetermined groups of said plurality of windings are arranged as a plurality of stacked aligned planar arrays with each rod passing through a plurality of respective aligned solenoids in a plurality of arrays.

19. The invention in accordance with claim 15, wherein said word energization means is applied a sufficient time after said digit energization means so as to permit transient effects occurring in said transformer as a result of the application of said digit energization means to have decayed to a level where they will not interfere with the detection of an output signal produced in response to the switching of an element.

20. In a magnetic memory capable of storing a plurality of multi-digit words in binary form and of having a selected word read out therefrom, a large plurality of bistable magnetic elements, each element corresponding to a binary digit of a word in said memory, a plurality of windings coupled to each element, energization means coupling the windings of said element to permit coincident selection of the elements corresponding to a selected word in said memory, means coupling the windings of said elements so as to provide at least first, second and third unique series strings of windings for each digit, said first and second series strings exhibiting substantially similar digit noise characteristics during selection and said first and third strings exhibiting substantially similar word noise characteristics during selection, output detection means and coupling means for coupling said second and third series strings to said output detection means in opposite relation to said first string, said coupling means including isolating means normally preventing coupling of signals in said strings to said output detection means, said energization means cooperating with said coupling means so that selection of an element in said first string conditions said isolating means to cause signals induced in said second and third strings to be applied to said output detection means along with signals induced in said first string.

21. In a magnetic memory capable of storing a plurality of multi-digit words in binary form and of having a word read out therefrom, a large plurality of bistable magnetic elements, each element corresponding to a binary digit of a word in said memory and being switchable from one state to the other in response to an applied energization of at least a predetermined magnitude, a word winding and a digit winding coupled to each element, means coupling said word windings so as to form a plurality of word lines each containing the word windings corresponding to a plurality of multi-digit words with all digits of a word being on the same word line, word energization means for applying a word current to a selected word line, said digit windings being functionally arranged into two groups of digit planes for each digit, each digit plane containing first and second series strings of digit windings corresponding to the same digit of a word and having the same position with respect to said word lines, each digit plane of a group having a corresponding digit plane in the other group such that the first and second strings in each couple digit windings of elements having the same respective word lines, an output transformer for each digit, coupling means for coupling said series strings to their respective transformers, digit energization means cooperating with said coupling means for applying a digit current to the series strings of a selected digit plane of a digit via the respective output transformer, said digit current being applied to said transformer so as to produce opposing signals which cancel therein, said coupling means being constructed and arranged for coupling the first and second series strings of each digit plane to its respective transformer so that digit noise generated therein when the digit plane is selected will be substantially cancelled in said transformer, said coupling means being further constructed and arranged so that word noise generated in the series strings of each selected digit plane will be substantially cancelled in its respective transformer by equal and opposite word noise generated in the series strings of the corresponding digit plane in the other group.

22. The invention in accordance with claim 21, wherein said word and digit energization means operate to provide both reading and writing into the elements corresponding to a selected word in said memory.

23. The invention in accordance with claim 21, wherein said word and digit energization means each includes a linear selection arrangement.

24. The invention in accordance with claim 21, wherein each element is a rod comprising an inner conductive substrate having a thin bistable magnetic film provided thereon with a thickness of less than 10,000 angstroms.

25. The invention in accordance with claim 21, wherein an element is switchable in response to the coincidence of a word current and a digit current in its respective word and digit windings, neither of said currents alone being sufficient to cause switching.

References Cited

UNITED STATES PATENTS

| | | | |
|---|---|---|---|
| 3,144,641 | 8/1964 | Raffel | 340—174 |
| 3,181,131 | 4/1965 | Pryor et al. | 340—174 |
| 3,209,337 | 9/1965 | Crawford | 340—174 |
| 3,303,481 | 2/1967 | Kessler | 340—174 |
| 3,319,233 | 5/1967 | Amemiya et al. | 340—174 |

STANLEY M. URYNOWICZ, Jr., Primary Examiner